(12) United States Patent
Pearlman et al.

(10) Patent No.: US 8,510,200 B2
(45) Date of Patent: Aug. 13, 2013

(54) GEOSPATIAL DATA BASED ASSESSMENT OF DRIVER BEHAVIOR

(75) Inventors: Richard Frank Pearlman, Carlsbad, CA (US); Sean Michael Walsh, Redwood City, CA (US); Daris Amon Schantz, Scottsdale, AZ (US); Steve Gertz, Smyrna, GA (US)

(73) Assignee: Spireon, Inc., Knoxville, TN (US)

( * ) Notice: Subject to any disclaimer, the term of this patent is extended or adjusted under 35 U.S.C. 154(b) by 0 days.

(21) Appl. No.: 13/421,571

(22) Filed: Mar. 15, 2012

(65) Prior Publication Data
US 2013/0141249 A1 Jun. 6, 2013

Related U.S. Application Data

(63) Continuation-in-part of application No. 13/310,629, filed on Dec. 2, 2011, and a continuation-in-part of application No. 13/328,070, filed on Dec. 16, 2011.

(51) Int. Cl.
*G06Q 40/06* (2012.01)

(52) U.S. Cl.
CPC ..................................... *G06Q 40/06* (2013.01)
USPC ....................................................... 705/36 R

(58) Field of Classification Search
None
See application file for complete search history.

(56) References Cited

U.S. PATENT DOCUMENTS

| | | | |
|---|---|---|---|
| 5,223,844 A | 6/1993 | Mansell et al. | |
| 5,390,125 A | 2/1995 | Sennott et al. | |
| 5,610,815 A | 3/1997 | Gudat | |
| 6,029,111 A | 2/2000 | Croyle | |
| 6,338,011 B1 | 1/2002 | Furst et al. | |
| 6,339,745 B1 | 1/2002 | Novik | |
| 6,385,539 B1 | 5/2002 | Wilson et al. | |
| 6,415,227 B1 | 7/2002 | Lin | |
| 6,584,403 B2 | 6/2003 | Bunn | |
| 6,748,320 B2 | 6/2004 | Jones | |
| 6,904,359 B2 | 6/2005 | Jones | |
| 7,039,520 B2 | 5/2006 | Draeger et al. | |
| 7,072,764 B2 | 7/2006 | Donath et al. | |
| 7,489,993 B2 | 2/2009 | Coffee et al. | |
| 7,527,288 B2 | 5/2009 | Breed | |
| 7,555,370 B2 | 6/2009 | Breed et al. | |
| 7,564,375 B2 | 7/2009 | Brinton et al. | |
| 7,571,051 B1 | 8/2009 | Shulman | |

(Continued)

FOREIGN PATENT DOCUMENTS

| | | |
|---|---|---|
| EP | 0581558 A1 | 2/1994 |
| EP | 0660083 A1 | 6/1995 |

(Continued)

*Primary Examiner* — Bruce I Ebersman
(74) *Attorney, Agent, or Firm* — Raj Abhyanker, P.C.

(57) ABSTRACT

A method of geospatial data based assessment driver behavior to improve driver safety and efficiency is disclosed. A method of a server device may comprise determining that a telemetry data is associated with a vehicle communicatively coupled with the server device and comparing the telemetry data with a driver objective data. A variance between the telemetry data and the driver objective data may then be determined. A performance score may be generated upon comparison of the variance to a threshold limit and/or the driver objective data. The performance score may be published along with other performance scores of other drivers in other vehicles also communicatively coupled with the server device to a reporting dashboard module. Elements of game theory may be implemented to create a team driving challenge and/or a driver performance program to generate the performance score to improve driver safety and efficiency for commercial fleets.

2 Claims, 15 Drawing Sheets

(56) References Cited

U.S. PATENT DOCUMENTS

| | | |
|---|---|---|
| 7,580,782 B2 | 8/2009 | Breed et al. |
| 7,650,210 B2 | 1/2010 | Breed |
| 7,657,354 B2 | 2/2010 | Breed et al. |
| 7,672,756 B2 | 3/2010 | Breed |
| 7,693,626 B2 | 4/2010 | Breed et al. |
| 7,876,239 B2 | 1/2011 | Horstemeyer |
| 7,899,591 B2 * | 3/2011 | Shah et al. .................. 701/29.4 |
| 8,009,086 B2 | 8/2011 | Grossnickle et al. |
| 8,103,450 B2 | 1/2012 | Takaoka |
| 8,106,757 B2 | 1/2012 | Brinton et al. |
| 8,111,154 B1 | 2/2012 | Puri et al. |
| 2001/0018628 A1 | 8/2001 | Jenkins et al. |
| 2003/0023614 A1 | 1/2003 | Newstrom |
| 2004/0006398 A1 * | 1/2004 | Bickford ........................ 700/30 |
| 2005/0007450 A1 | 1/2005 | Hill et al. |
| 2007/0057781 A1 | 3/2007 | Breed |
| 2007/0061076 A1 | 3/2007 | Shulman |
| 2007/0087756 A1 * | 4/2007 | Hoffberg ..................... 455/450 |
| 2007/0096565 A1 | 5/2007 | Breed et al. |
| 2007/0115101 A1 | 5/2007 | Creekbaum et al. |
| 2007/0139216 A1 | 6/2007 | Breed |
| 2007/0159354 A1 | 7/2007 | Rosenberg |
| 2007/0162550 A1 | 7/2007 | Rosenberg |
| 2007/0239322 A1 | 10/2007 | McQuade et al. |
| 2008/0040005 A1 | 2/2008 | Breed |
| 2008/0042875 A1 | 2/2008 | Harrington et al. |
| 2008/0051995 A1 | 2/2008 | Lokshin et al. |
| 2008/0147265 A1 | 6/2008 | Breed |
| 2008/0234933 A1 | 9/2008 | Chowdhary et al. |
| 2008/0252431 A1 | 10/2008 | Nigam |
| 2008/0262669 A1 | 10/2008 | Smid et al. |
| 2010/0094500 A1 | 4/2010 | Jin |
| 2010/0207754 A1 | 8/2010 | Shostak et al. |
| 2011/0090399 A1 | 4/2011 | Whitaker et al. |
| 2011/0137489 A1 * | 6/2011 | Gilleland et al. .................. 701/2 |
| 2011/0166773 A1 * | 7/2011 | Raz et al. ...................... 701/123 |
| 2011/0275388 A1 | 11/2011 | Haney |
| 2012/0123806 A1 * | 5/2012 | Schumann et al. ................ 705/4 |

FOREIGN PATENT DOCUMENTS

| | | |
|---|---|---|
| EP | 0767448 A1 | 4/1997 |
| EP | 0785132 A1 | 7/1997 |
| EP | 0806632 A1 | 11/1997 |
| EP | 0763713 A3 | 5/1998 |
| EP | 0795700 A3 | 6/1998 |
| EP | 0795760 A3 | 4/1999 |
| EP | 1742083 A1 | 1/2007 |
| EP | 1744576 A1 | 1/2007 |
| EP | 1752949 A1 | 2/2007 |
| EP | 1760655 A2 | 3/2007 |
| EP | 01777541 A1 | 4/2007 |
| EP | 1791101 A1 | 5/2007 |
| EP | 1804223 A2 | 7/2007 |
| EP | 1870788 A1 | 12/2007 |
| EP | 1894779 A1 | 3/2008 |
| EP | 1895273 A2 | 3/2008 |
| EP | 1912191 A1 | 4/2008 |
| EP | 1927961 A1 | 6/2008 |
| EP | 1944190 A1 | 7/2008 |
| EP | 1975563 A2 | 10/2008 |
| EP | 1975565 A2 | 10/2008 |
| EP | 1975566 A2 | 10/2008 |
| EP | 2000889 A2 | 12/2008 |
| WO | 0219683 A1 | 3/2002 |

* cited by examiner

| TELEMETRY DATA 106 | DRIVER OBJECTIVE DATA 108 | VARIANCE 302 | THRESHOLD LIMIT 304 | PERFORMANCE SCORE 306 |
|---|---|---|---|---|
| ABCD | ABCD | NO | > ABCD | 94/100 |
| ZYX | XYZ | YES | < XYZ | 75/100 |
| AVERAGE SPEED = 75 MPH | AVERAGE SPEED < 70 MPH | YES | 70 MPH | 70/100 |
| ACCELERATION RATE = 4 M/S | ACCELERATION RATE < 5 M/S | NO | 5 M/S | 90/100 |
| ••• | ••• | ••• | ••• | ••• |

TABLE VIEW 300

FIGURE 3

TEAM DRIVING CHALLENGE

| ORDER | METRICS | SCORING FACTOR | ZERO POINT | MAXIMUM SCORE | VEHICLE 104A | VEHICLE 104B | VEHICLE 104C | VEHICLE 104D |
|---|---|---|---|---|---|---|---|---|
| 1 | % OF MINUTES DRIVING AT/BELOW POSTED LIMIT | 2000 | 0.90 | 200 | 0.99 | 0.97 | 0.9 | 0.93 |
| 2 | % OF DRIVING MINUTES WITHOUT HARD BRAKING INCIDENT | 4000 | 0.95 | 200 | 0.95 | 0.99 | 0.99 | 0.98 |
| 3 | % OF AUTHORIZED DRIVING TO TOTAL DRIVING | 1000 | 0.90 | 100 | 0.95 | 0.83 | 0.9 | 0.98 |
| 4 | % OF DRIVING MINUTES WITHOUT ACCELERATION INCIDENT | 1000 | 0.90 | 100 | 0.96 | 0.95 | 0.99 | 0.97 |
| 5 | % OF MINUTES MOVING WHEN ENGINE RUNNING | 300 | 0.70 | 90 | 0.8 | 0.85 | 0.95 | 0.7 |
| 6 | % OF WORKED DAYS WITH ON-TIME DAILY DISPOSITION | 50 | 0.00 | 50 | 0.8 | 1 | 1 | 0.6 |
| | | | POINTS | 740 | | | | |

| | ORDER | | | | |
|---|---|---|---|---|---|
| % OF MINUTES DRIVING AT/BELOW POSTED LIMIT | 1 | 180 | 140 | 0 | 60 |
| % OF MINUTES MOVING WHEN ENGINE RUNNING | 5 | 0 | 160 | 160 | 120 |
| % OF DRIVING MINUTES WITHOUT HARD BRAKING INCIDENT | 2 | 50 | -70 | 0 | 80 |
| % OF DRIVING MINUTES WITHOUT ACCELERATION INCIDENT | 4 | 60 | 50 | 90 | 70 |
| % OF WORKED DAYS WITH ON-TIME DAILY DISPOSITION | 6 | 30 | 45 | 75 | 0 |
| % OF AUTHORIZED DRIVING TO TOTAL DRIVING | 3 | 40 | 50 | 50 | 30 |
| TOTALS | | 360 | 375 | 375 | 360 |

TEAM ANALYTICS VIEW 1100

FIGURE 11A

THIS WEEK

| DRIVER STATS | RANK | TOTAL SCORE | BRAKING SCORE | SPEED SCORE | ACCEL. SCORE | IDLING SCORE | AUTH DRIV SCORE |
|---|---|---|---|---|---|---|---|
| VEHICLE 104A | 4 | 519 | 160 | 115 | 87 | 72 | 85 |
| VEHICLE 104B | 21 | 498 | 155 | 121 | 70 | 70 | 82 |
| VEHICLE 104C | 50 | 488 | 163 | 103 | 64 | 68 | 90 |
| VEHICLE 104D | 54 | 482 | 154 | 110 | 68 | 65 | 85 |
| VEHICLE 104E | 71 | 320 | 142 | 106 | 72 | - | - |
| VEHICLE 104F | 99 | 0 | - | - | - | - | - |

| TEAM STATS (THS FAR) | | SCALED SCORE |
|---|---|---|
| TEAM A | 3 | 95/100 |
| TEAM B | 1 | 90/100 |
| TEAM C | 2 | 85/100 |
| TEAM D | 4 | 80/100 |

LAST WEEK

SEASON

TEAM ANALYTICS VIEW 1100

FIGURE 11B

GEOSPATIAL DATA BASED ASSESSMENT OF DRIVER BEHAVIOR

CLAIM OF PRIORITY

This utility patent application is a Continuation-In-Part (CIP) of and incorporates by references in its entirety, U.S. Utility patent application Ser. No. 13/310,629 titled "ALERT GENERATION BASED ON A GEOGRAPHIC TRANSGRESSION OF A VEHICLE" and filed on Dec. 2, 2011, and U.S. Utility patent application Ser. No. 13/328,070 titled "GEOSPATIAL DATA BASED MEASUREMENT OF RISK ASSOCIATED WITH A VEHICULAR SECURITY INTEREST IN A VEHICULAR LOAN PORTFOLIO" and filed on Dec. 16, 2011.

FIELD OF TECHNOLOGY

This disclosure relates generally to geospatial data based assessment of driver behavior with the goal of improving driver safety and efficiency, and in one example embodiment, using telemetry data associated with a vehicle to determine a variance between the telemetry data and one or more driver objectives and/or pattern of usage information and to generate and publish a performance score associated with an individual driver and/or a team and/or fleet of drivers. The performance score may be utilized to incentivize and improve driver safety and efficiency of the individual driver and/or the team and/or fleet of drivers by using components of game theory.

BACKGROUND

Driver safety and efficiency is of paramount concern to any party operating a vehicle on roads and highways. Improving driver safety and efficiency is very important to a company running and/or managing a fleet of commercial vehicles. Such commercial vehicle fleets are typically comprised of trucks and other heavy duty vehicles that usually transport high value goods over vast distances. Other vehicle fleets may also use and/or operate passenger vehicles (e.g., taxi companies, security companies, etc.) to be operated off-highway. Therefore, parties interested in assessing one or more driver's safety and/or efficiency may be interested in assessing the driving behavior of the driver of the vehicle in relation to the driving behavior of other drivers of other vehicles that are part of the same fleet. A non-punitive, yet challenging competition between drivers may give individual drivers the incentive to drive safely and efficiently. Telemetry data from vehicles may give interested parties an understanding of the driver's driving patterns and may contribute to the assessment of safety and/or efficiency.

Interested parties may use and/or employ geospatial positioning devices that communicate geospatial data based on a worldwide navigational and surveying facility dependent on the reception of signals from an array of orbiting satellites (e.g., Global Positioning System (GPS) technology). Another device might be a Real Time Locator System (RTLS) which uses Radio Frequency Identification (RFID) technology to transmit the physical location of RFID tagged objects. In addition, such geospatial positioning devices may be placed directly within vehicles by Original Equipment Manufacturers (OEMs). For example, car manufacturers may install OEM telematics solutions (e.g., OnStar™) within all their vehicles.

The use of GPS, RTLS, RFID or OEM telematics based geospatial positioning devices to enable the gathering of telemetry data is gaining prominence. Geospatial positioning devices are frequently used to track and gather telemetry data associated with the vehicle. Certain locations, driving behaviors and/or patterns of movement associated with the driver and his/her vehicle may be indicative of an increased or decreased safety and/or efficiency risk. Gathering such data indicative of a driver's safety and/or efficiency may be useful to improve the safety and/or efficiency of the driver and/or a fleet of drivers using components of game theory.

For example, one reliable indicator of the safety of a driver may be the acceleration rate of the driver's vehicle. If the vehicle acceleration is high, it is likely that the driver may be wasting gasoline and increasing risks of accidents and other mishaps. This determination may be extrapolated to analyze and assess the safety and/or efficiency risk of an entire fleet of vehicles and their corresponding individual drivers. Therefore, what is needed is a method for utilizing geospatial data (e.g., locational data associated with the a vehicle) to assess driver behavior by gathering and using telemetry data associated with the vehicle to improve driver safety and efficiency by incorporating components of game theory (e.g., mathematics, statistics, economics, and psychology) to incentivize and motivate drivers to drive safely and efficiently.

SUMMARY

A method of geospatial data based assessment of driver behavior is disclosed. In one aspect, the method may involve determining that a telemetry data is associated with a vehicle that is communicatively coupled to a server device. The method may also involve comparing the telemetry data with a driver objective data associated with the vehicle, determining a variance between the telemetry data and the driver objective data, generating a performance score upon comparison of the variance to the driver objective data and/or a threshold limit, and publishing the performance score along with other performance scores of other drivers in other vehicles also communicatively coupled with the server device to a reporting dashboard module.

In another aspect, comparing the telemetry data with the driver objective data may further comprise an algorithm that may consider a number of key performance indicators associated with a behavior trait of the driver of the vehicle. These performance indicators may comprise a limit data, a route plan data, an engine idling duration data, a maximum rate of acceleration of the vehicle data, and/or a maximum rate of deceleration of the vehicle data. According to one aspect, the telemetry data may comprise of a position of the vehicle, a velocity of the vehicle, a direction of the vehicle, an acceleration of the vehicle, a deceleration of the vehicle, and/or an engine ignition status of the vehicle.

In at least one illustrative aspect, the method may comprise utilizing a geospatial positioning device in a vehicle to receive a telemetry data associable with the vehicle on a server device that contains at least one driver objective data. It may also involve gathering a pattern of usage information associable with a driver of the vehicle from the telemetry data and comparing the pattern of usage information associable with the driver of the vehicle to at least one driver objective data contained on the server device. A performance score associable with the driver of the vehicle based on the driver objective data may then be generated.

According to another aspect, a method of improving a driver's behavior may comprise utilizing a geospatial positioning device in a vehicle to receive a telemetry data associable with the vehicle on a server device that contains at least one driver objective data. A pattern of usage information indicative of a safety rating and/or an efficiency rating associable with the driver of the vehicle from the telemetry data may then be gathered. The method, according to one or more aspects, may involve comparing the pattern of usage information indicative of the safety rating and/or the efficiency rating and associable with the driver of the vehicle to at least one driver objective data contained on the server device and generating a performance score indicative of the safety rating and/or the efficiency rating associable with the driver and based on the driver objective data.

In another aspect, the performance score indicative of the safety rating and/or the efficiency rating associable with the driver may be further compared to a plurality of performance scores indicative of another safety rating and another efficiency rating associable with a plurality of drivers. The plurality of drivers may then be ranked based on a comparison of the performance scores associable with the plurality of drivers. According to one aspect, a competitive situation may thus be created wherein the outcome of a driver's performance score may depend critically on the actions of the plurality of drivers that may be a part of the driver's own team and/or fleet. This competitive situation among drivers may be created by incorporating components of mathematics, statistics, economics, and psychology to analyze a theory of competition stated in terms of gains and losses (e.g., the performance score) among opposing drivers. The goal, according to one or more aspects, would be to improve driver safety and/or efficiency in a non-punitive, yet competitive manner.

The methods and systems disclosed herein may be implemented by any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 3 illustrates a table view showing the comparison of a variance to a threshold limit and a generation of a corresponding performance score, according to one or more embodiments.

FIG. 11 illustrates a team analytics view, according to one or more embodiments.

Figure 1:
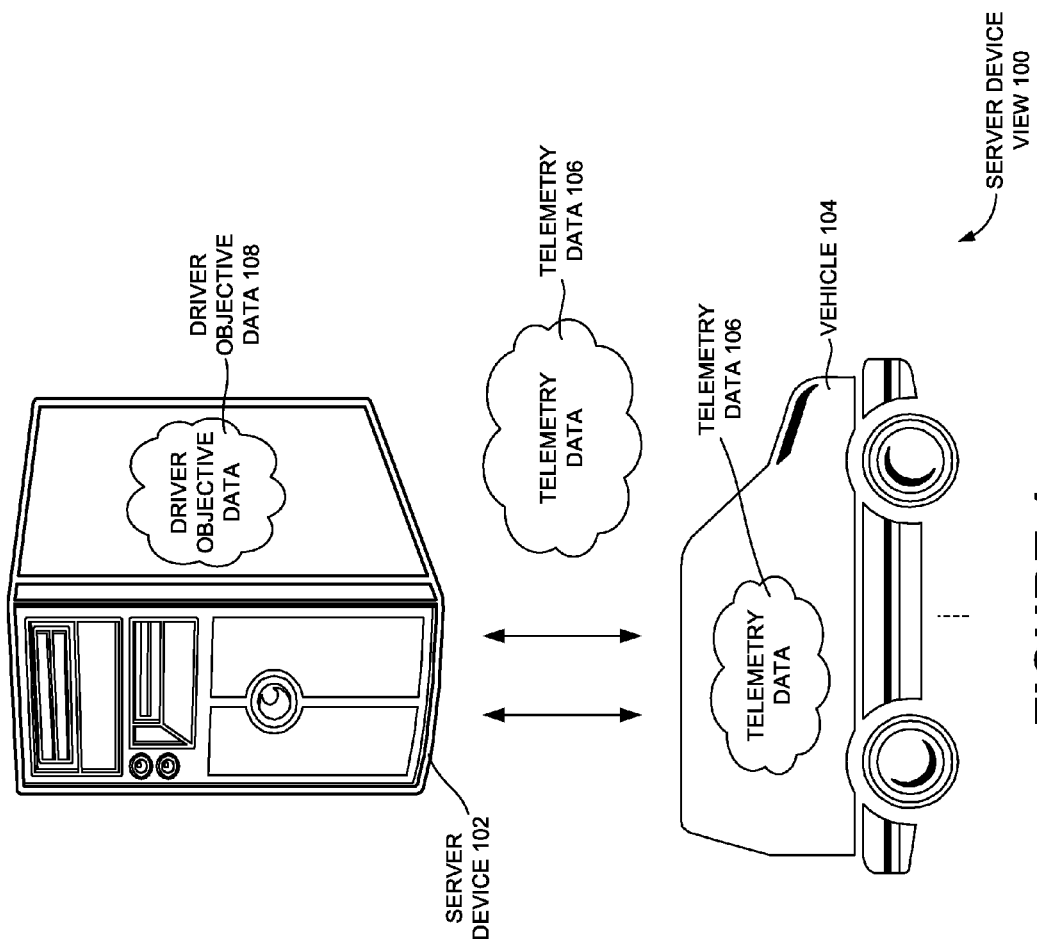
FIG. 1 illustrates a server device view showing receiving and comparison of a telemetry data (from a vehicle) with a driver objective data in a server device, according to one or more embodiments.

Other features of the present embodiments will be apparent from the accompanying drawings and from the detailed description that follows.

DETAILED DISCLOSURE

A method of a server device 102 comprising determining that a telemetry data 106 is associated with a vehicle 104 communicatively coupled with the server device 102 and comparing the telemetry data 106 with a driver objective data 108 associated with the vehicle 104 is disclosed. According to one or more embodiments, a variance 302 between the telemetry data 106 and the driver objective data 108 may be determined. A performance score 306 may be generated upon comparison of the variance 302 to the driver objective data 108 and/or a threshold limit 304. According to an illustrative embodiment, the performance score 306 may be published along with other performance scores of other drivers in other vehicles also communicatively coupled with the server device 102, to a reporting dashboard module 216.

FIG. 1A illustrates a server device view 100, according to one or more embodiments. Telemetry data 106 from vehicle 104 may be received by a server device 102 which may have driver objective data 108. The driver objective data 108 may be resident on the server device 102 and may be predetermined. The transfer and receiving of the telemetry data 106 from vehicle 104 by the server device 102 may be based on GPS, RTLS, RFID or OEM telematics. It will be appreciated that the party determining, setting and/or creating the driver objective data 108 may be an organization. The organization may possess a security interest in vehicle 104. The organization may be a corporation, a partnership, an individual, a government, a non-governmental organization, an international organization, an armed force, a charity, a not-for-profit corporation, a cooperative, or a university. It may be a hybrid organization that may operate in both the public sector and the private sector, simultaneously fulfilling public duties and developing commercial market activities, according to one or more embodiments.

According to other embodiments, the party driving vehicle 104 may be an agent of an organization (e.g., a bank, a lender, or any other lending institution or person) that may possess a security interest in vehicle 104. The relationship between the driver of vehicle 104 and the party having a security interest in vehicle 104 and/or the party that may predetermine and/or choose the driver objective data 108, may expressly or impliedly authorize the party having the security interest and/or the driver to work under the control and on behalf of the organization. The party having the security interest may thus be required to negotiate on behalf of the organization to secure and/or provide services. The security interest in vehicle 104 may be a singular security interest associated with one vehicle or a vehicular loan portfolio security interest associated with multiple vehicles, according to one or more embodiments.

In one or more embodiments, the telemetry data 106 associated with vehicle 104 may be automatically determined based on a situs of vehicle 104. The situs may be determined using GPS technology and may be the location where vehicle 104 may be treated as being located for legal and jurisdictional purposes, according to one embodiment. The situs may also be the place where vehicle 104 is situated (e.g., the impound lot). It may also be the temporary and/or permanent location of vehicle 104 (e.g., the driver's favorite drinking establishment or the driver's home). The situs may be a home address or a work address of the driver. The driver may have multiple locations, according to one embodiment.

According to an illustrative example, telemetry data 106 may be associated with vehicle 104 based on the periodic analysis of the location and movement of vehicle 104. The telemetry data 106 may then be compared to the driver objective data 108. This driver objective data 108 may include a particular predetermined movement of vehicle 104. For example, and according to one or more embodiments, vehicle 104 may have a high rate of acceleration, the driver of vehicle 104 may leave the engine idling for a period of time, vehicle 104 may not have been driven for a certain period of time, or vehicle 104 may have been driven, but too infrequently (e.g., less than 10 miles). The number of ignition starts and stops (e.g., the driver may not have started vehicle 104 for a period of time or may have only started vehicle 104 once in a given week) and vehicle 104 decelerating and/or braking suddenly may also be communicated as telemetry data 106 to be compared with driver objective data 108, according to one or more embodiments.

According to another embodiment, the amount of time may vary as determined by the party setting, determining and/or choosing the driver objective data 108, a lender (e.g., a bank or lending institution) or a provider (e.g., a company selling GPS geospatial positioning devices and/or a company providing the corresponding web interface to track vehicles). The party setting, determining and/or choosing the driver objective data 108 may sell the hardware and/or may provide a software solution to track vehicle 104 and receive telemetry data 106 from vehicle 104. The predetermined driver objective data 108 and threshold limit 304 may be determined by the party having a security interest in vehicle 104, according to one or more embodiments.

Figure 2:
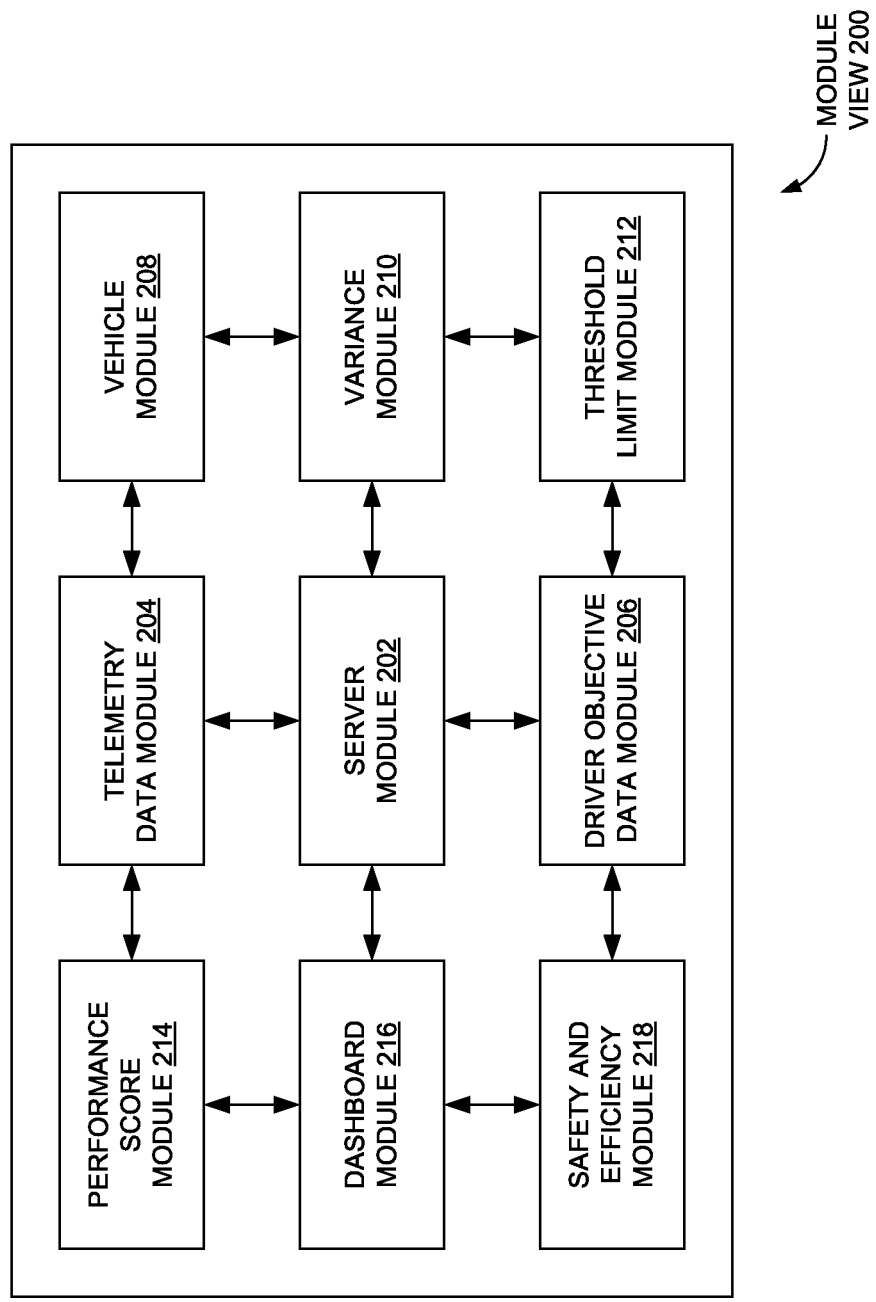
FIG. 2 illustrates a module view wherein the methods and systems disclosed herein may be implemented by any means for achieving various aspects, according to one or more embodiments.

FIG. 2 illustrates a module view 200 wherein the methods and systems disclosed herein may be implemented by any means for achieving various aspects, according to one or more embodiments. The server module 202 may perform all tasks associated with the server device 102. The telemetry data module 204 may collect, categorize, assess and/or analyze telemetry data 106 associated with vehicle 104. The driver objective data module 206 may collect, categorize, assess, select, choose, determine and/or analyze driver objective data 108 to be compared with telemetry data 106. The vehicle module 208 may determine the location of vehicle 104 and may associate telemetry data 106 with vehicle 104. The variance module 210 may determine the variance 302 between the telemetry data 106 and the driver objective data 108 and/or the threshold limit 304, according to one or more embodiments.

The threshold limit module 212 may permit the comparison of the variance 302 to a threshold limit 304, according to one embodiment. The threshold limit 304 may be the point where the performance score 306 may yield zero points. According to one or more embodiments, if a driver's ratio of safe deceleration minutes to total driving minutes decreases below the threshold limit 304 (e.g., 97%), the driver may receive zero points. If the driver's ratio exceeds the threshold limit 304 (e.g., 97%), the driver may start scoring points up to a maximum score which may be achieved for a 100% ratio (e.g., a perfect driving record). The performance score module 214 may generate a performance score 306 upon comparison of the variance 302 to a threshold limit 304 and/or the driver objective data 108. It may also, according to one embodiment, publish the performance score 306 along with other performance scores of other drivers in other vehicles also communicatively coupled with the server device 102, to a reporting dashboard module 216. The dashboard module 216 may visually indicate and/or publish the performance score 306 and other information to be viewed by the driver of vehicle 104 (see FIGS. 12 and 13). Varying performance scores may be calculated based on the same driving objectives in a way that may make a fair comparison between drivers with differing driving profiles, according to one or more embodiments.

The safety and efficiency module 218 may create and implement a driver performance program in the form of a game and/or a non-punitive, yet challenging competition among drivers of a plurality of vehicles to incentivize and improve overall driver safety and efficiency. It may, according to one or more embodiments, incorporate components of game theory that may use one or more mathematical models of devising an optimum strategy to a given driving situation and/or driving behavior wherein the driver of vehicle 104 may have the choice of limited and fixed options (e.g., threshold limit 304 and/or driver objective data 108). The safety and efficiency module 218 may store and implement algorithms based on mathematics, statistics, economics, and/or psychology to improve driver safety and efficiency. It will be appreciated that it may also perform analysis of strategies for dealing with competitive situations wherein the outcome of a driver's action may depend critically on the actions of other drivers, according to one or more embodiments.

FIG. 3 illustrates a table view, according to one or more embodiments. For example, if the threshold limit 304 indicates a value greater than ABCD, the telemetry data 106 and the driver objective data 108 both registering exactly ABCD may indicate no variance 302. This may result in a high performance score 306 (e.g., 94/100). However, if the threshold limit 304 is less than XYZ and the telemetry data 160 registers ZYX and the driver objective data 108 registers XYZ, there may be a variance 302 and a lower performance score 302 (e.g., 75/100). Similarly, and according to one or more embodiments, if the threshold limit 304 for average speed is 70 miles per hour and the driver objective data 108 indicates a desirable average speed of less than 70 miles per hour, the telemetry data 106 indicating that the driver is traveling at an average speed of 75 miles per hour may be indicative of a variance and a low performance score 306 (e.g., 70/100). According to an illustrative example, if the threshold limit 304 for acceleration rate is 5 miles per second and the driver objective data 108 indicates a desirable acceleration rate of less than 5 miles per second, the telemetry data 106 indicating that the driver is accelerating at 4 miles per second may not create a variance and thus may lead to a higher performance score (e.g., 90/100). The performance score 306 associable with the driver of vehicle 104 may be compared to another performance score associable with a driver of another vehicle (see FIG. 4), according to one or more embodiments.

Figure 6:
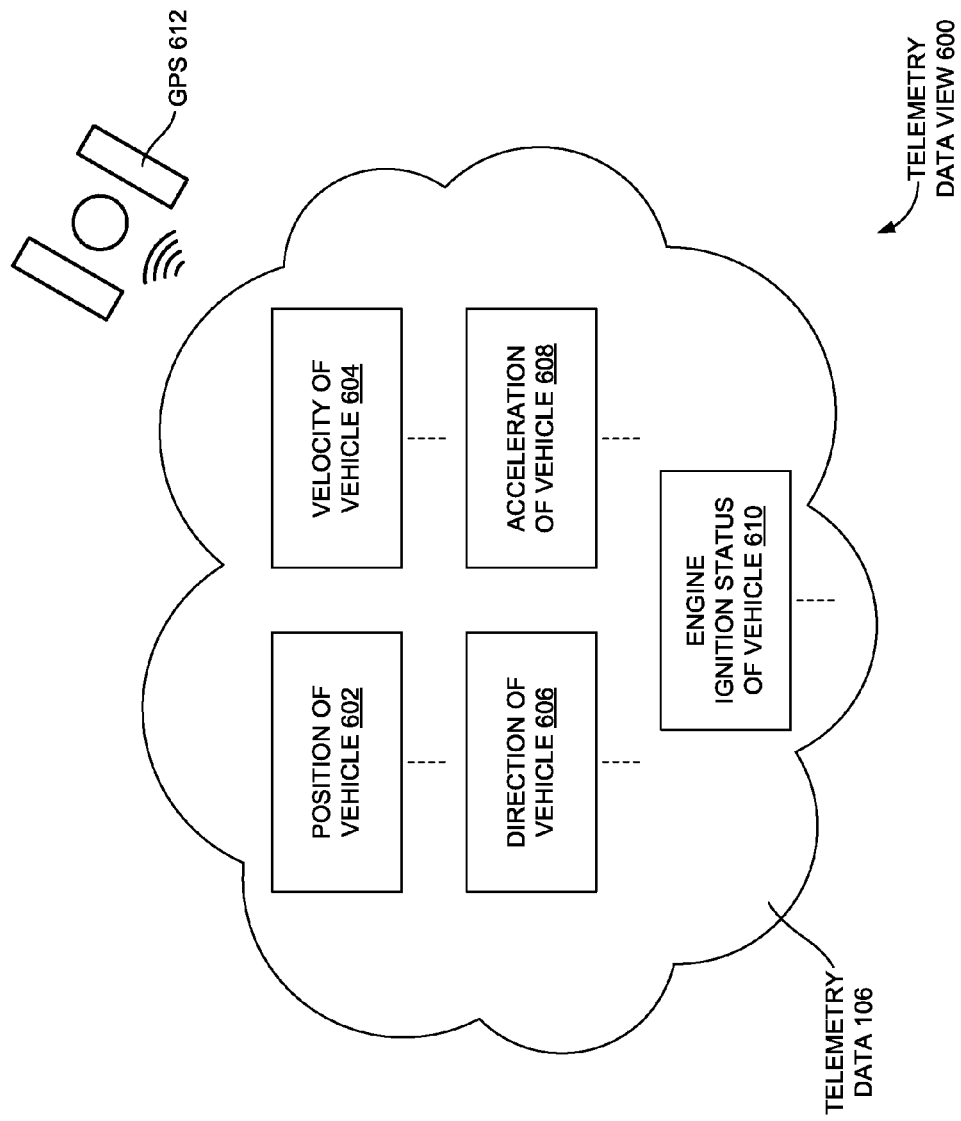
FIG. 6 is a telemetry data view that illustrates various pieces of telemetry and/or driving pattern data that may comprise the telemetry data, according to one or more embodiments.

According to other embodiments, the telemetry data 106 may comprise, but may not be limited to, a position of vehicle 104, a velocity of vehicle 104, a direction of vehicle 104, an acceleration of vehicle 104, a deceleration of vehicle 104, and/or an engine ignition status of vehicle 104 (see FIG. 6). Comparing the telemetry data 106 with the driver objective data 108 may further comprise an algorithm that may consider several key performance indicators associated with a behavior trait of the driver of vehicle 104 and may comprise, but may not be limited to, a limit data 702, a route plan data 704, an engine idling duration data 706, a maximum rate of acceleration of the vehicle data 708, and/or a maximum rate of deceleration of the vehicle data 710, according to one or more embodiments (see FIG. 7).

Figure 4:
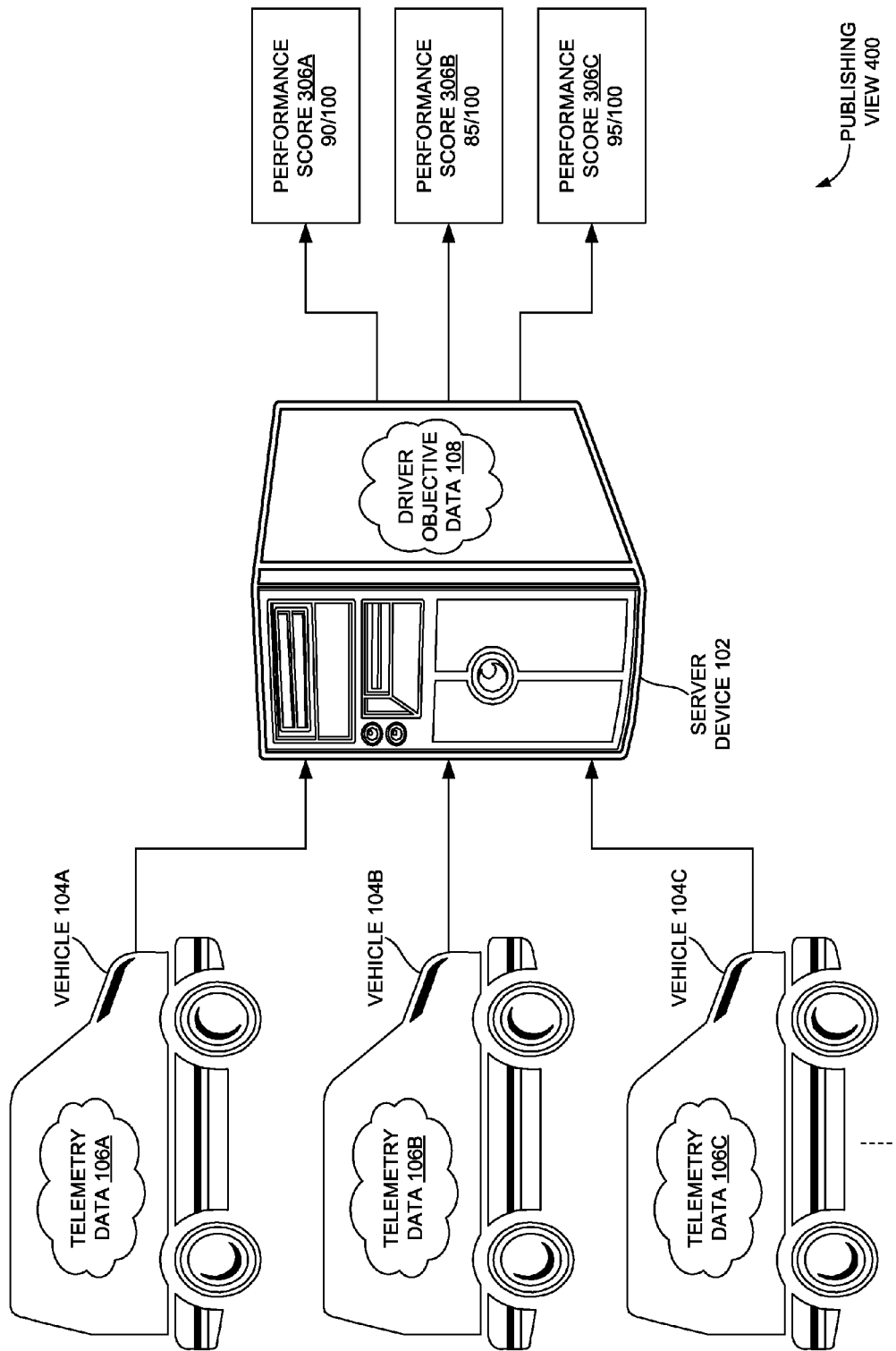
FIG. 4 is a publishing view illustrating the multiple performance scores that may be associable with multiple vehicles, according to one or more embodiments.

FIG. 4 illustrates a publishing view 400 according to one or more embodiments. Multiple different vehicles may have associated multiple different telemetry data. For example, telemetry data 106A from vehicle 104A may be compared to the driver objective data 108 on the server device 102 and may result in a corresponding performance score 306A. Similarly, and according to another embodiment, telemetry data 106B from vehicle 104B may be compared to the driver objective data 108 on the server device 102 and may result in a corresponding performance score 306B Likewise, telemetry data 106C from vehicle 104C may be compared to the driver objective data 108 on the server device 102 and may result in a corresponding performance score 306C, according to an illustrative embodiment. The performance scores 306A, 306B and 306B may be published separately or as a part of a master performance score.

Figure 5:
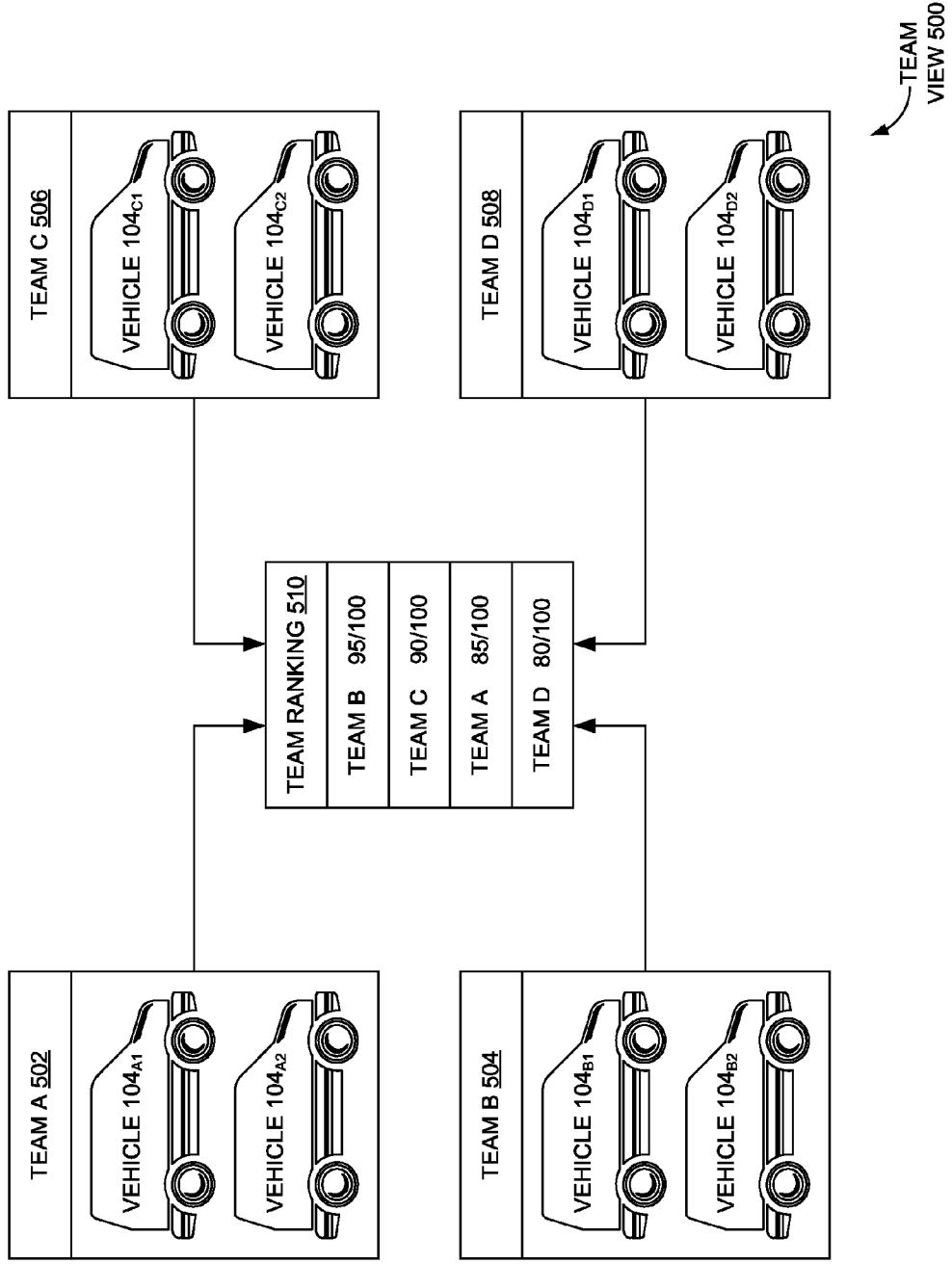
FIG. 5 is a team view that illustrates four teams of multiple vehicles and corresponding team performance scores and team rankings, according to one or more embodiments.

FIG. 5 illustrates a team view 500 according to one or more embodiments. Team A 502 may comprise vehicle 104A1 and vehicle 104A2. Similarly, and according to one or more exemplary embodiments, Team B 504 may comprise vehicle 104B1 and vehicle 104B2, Team C 506 may comprise vehicle 104C1 and vehicle 104C2, and Team D 508 may comprise vehicle 104D1 and vehicle 104D2. Upon comparison of the telemetry data 106 from each vehicle from each team, a team ranking 510 may be generated, according to one or more embodiments. The team ranking 510 may consider the individual performance of each vehicle in each team as well as the combined performance of the vehicles on each team to arrive at a master team performance score. According to an illustrative example, a plurality of drivers may also be ranked based on a comparison of the performance scores associable with the plurality of drivers.

FIG. 6 illustrates examples of possible telemetry data that may be collected and transmitted to and received by the server device 102 as telemetry data 106 to be compared to the driver objective data 108, according to one or more embodiments. Such telemetry data 106 may include, but is not limited to, position of vehicle 602, velocity of vehicle 604, direction of vehicle 606, acceleration of vehicle 608, and engine ignition status of vehicle 610. In essence, telemetry data 106 may include any and all data that may provide information about vehicle 104 (e.g., location, speed, diagnostics etc.) and that may be transmitted to the server device 102, according to one or more embodiments. Telemetry data 106 may be gathered using a GPS 612 or may be gathered by taking advantage of the low cost and ubiquity of Global System for Mobile Communication (GSM) networks by using Short Messaging Service (SMS) to receive and transmit telemetry data 106, according to one or more embodiments. According to other embodiments, international standards such as Consultative Committee for Space Data Systems (CCSDS) and/or Inter Range Instrumentation Group (IRIG) may also be implemented to gather and transmit telemetry data 106. According to one or more exemplary embodiments, portable telemetry, telematics, telecommand, data acquisition, automatic data processing, Machine to Machine (M2M), Message Queue Telemetry Transport (MQTT), remote monitoring and control, remote sensing, Remote Terminal Unit (RTU), Supervisory Control and Data Acquisition (SCADA), and/or wireless sensor networks may be used and/or implemented to gather and transfer telemetry data 106 to the server device 102 to be compared with the driver objective data 108 and the threshold limit 304.

Figure 7:
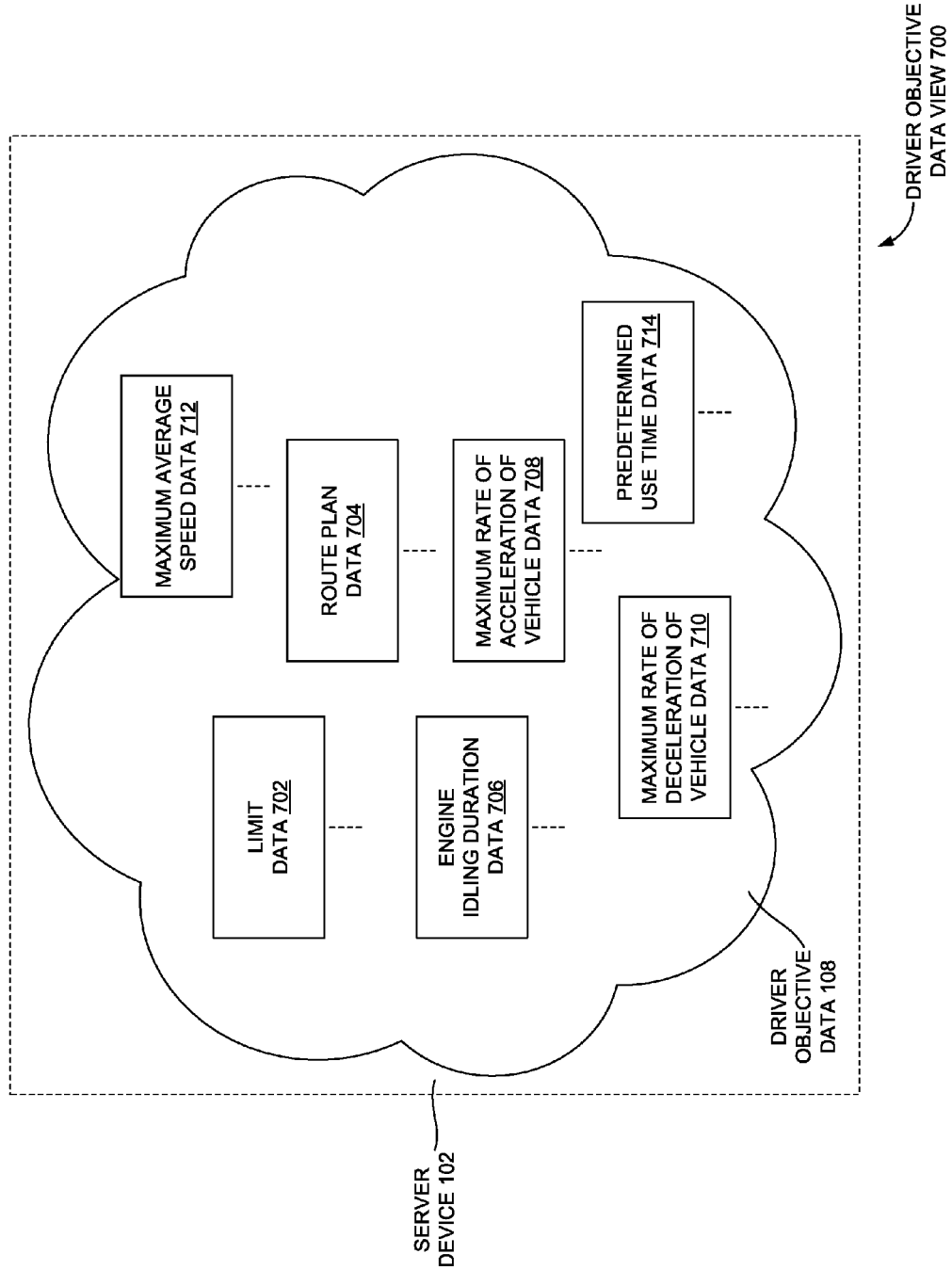
FIG. 7 is a driver objective data view that illustrates various pieces of data that may comprise the driver objective data, according to one or more embodiments.

FIG. 7 illustrates examples of possible driver objective data 108 that may be resident on the server device 102 and may be compared with the telemetry data 106, according to one or more embodiments. Such driver objective data 108 may include, but is not limited to, limit data 702, route plan data 704, engine idling data 706, maximum rate of acceleration of vehicle data 708, maximum rate of deceleration of vehicle data 710, maximum average speed data 712, and predetermined use time data 714. According to one embodiment, the limit data 702 may be associable with a posted speed limit at a particular geospatial location surrounding a present location of vehicle 104 as determined through a mapping data source having all posted speed limits in a geospatial vicinity, such that an actual driving behavior data may be compared with the posted speed limit at the particular geospatial location to determine whether the variance 302 is beyond the threshold limit 304. According to an illustrative example, if the driver of vehicle 104 is driving faster than the average speed limit at a given location, his performance score 306 would reflect the variance 302 with the threshold limit 304 when compared with the desirable driver objective data 108 applicable to speed limits.

According to another embodiment, the route plan data may be associable with a predetermined route plan within the particular geospatial location surrounding the present location of the vehicle 104 as determined through the mapping data source having all route plans in the geospatial vicinity, such that the actual driving behavior data is compared with the route plan at the particular geospatial location to determine whether the variance 302 is beyond the threshold limit 306. According to an illustrative example, if the driver of vehicle 104 varies from a desirable, predetermined and/or given route plan, his performance score 306 would reflect the variance 302 with the threshold limit 304 when compared with the desirable driver objective data 108 applicable to route plans Likewise, an engine idling duration data 706 may be used to calculate the amount of time an engine of the vehicle 104 is idle in the geospatial vicinity surrounding the present location of the vehicle, such that the actual driving behavior data is compared with the amount of time the engine of the vehicle 104 is idle to determine whether the variance 302 is beyond the threshold limit 304. According to an illustrative example, if the driver of vehicle 104 varies from a desirable, predetermined and/or given engine idling time, his performance score 306 would reflect the variance 302 with the threshold limit 304 when compared with the desirable driver objective data 108 applicable to engine idling duration.

According to one or more embodiments, a maximum rate of acceleration of the vehicle data 708 may be used to measure the rates of acceleration of the vehicle 104 in the geospatial vicinity surrounding the present location of the vehicle 104, such that the actual driving behavior data is compared with the maximum rate of acceleration of the vehicle 104 to determine whether the variance 302 is beyond the threshold limit 304. Similarly, a maximum rate of deceleration of the vehicle data 710 may be used to measure the rates of deceleration of the vehicle 104 in the geospatial vicinity surrounding the present location of the vehicle 104, such that the actual driving behavior data is compared with the maximum rate of deceleration of the vehicle 104 to determine whether the variance 302 is beyond the threshold limit 304. According to both embodiments, if the driver of vehicle 104 varies from a desirable, predetermined and/or given maximum rate of acceleration and/or deceleration, his performance score 306 would reflect the variance 302 with the threshold limit 304 when compared with the desirable driver objective data 108 applicable to maximum rate of acceleration and/or deceleration of vehicle 104. According to an illustrative example, the number of minutes that the acceleration exceeds the threshold limit 304 may also be calculated and compared to the total driving minutes for the period. This ratio may be used to compute the driver's performance score 306, according to one or more embodiments.

Vehicle 104, according to one or more embodiments, may be a part of a fleet of vehicles and may refer to all forms of transportation including cars, motorcycles, planes, trucks, heavy equipment, jet skis, and all other modes of commercial and/or recreational transportation. The party that may predetermine the driver objective data 108 and/or may structure a driver performance program (e.g., using game theory) may be a company that provides GPS devices, GPS vehicle tracking services, OEM telematics (e.g., OnStar™), and/or fleet management services. The company may also provide fleet tracking and mobile asset management services. It may also be a sub-prime vehicle finance and/or asset tracking company, a financial institution, an automobile dealership, a specialty finance company, a dealership finance company, a bank, a credit union, or a private financier in addition to any entity or organization, according to one or more exemplary embodiments.

Figure 8:
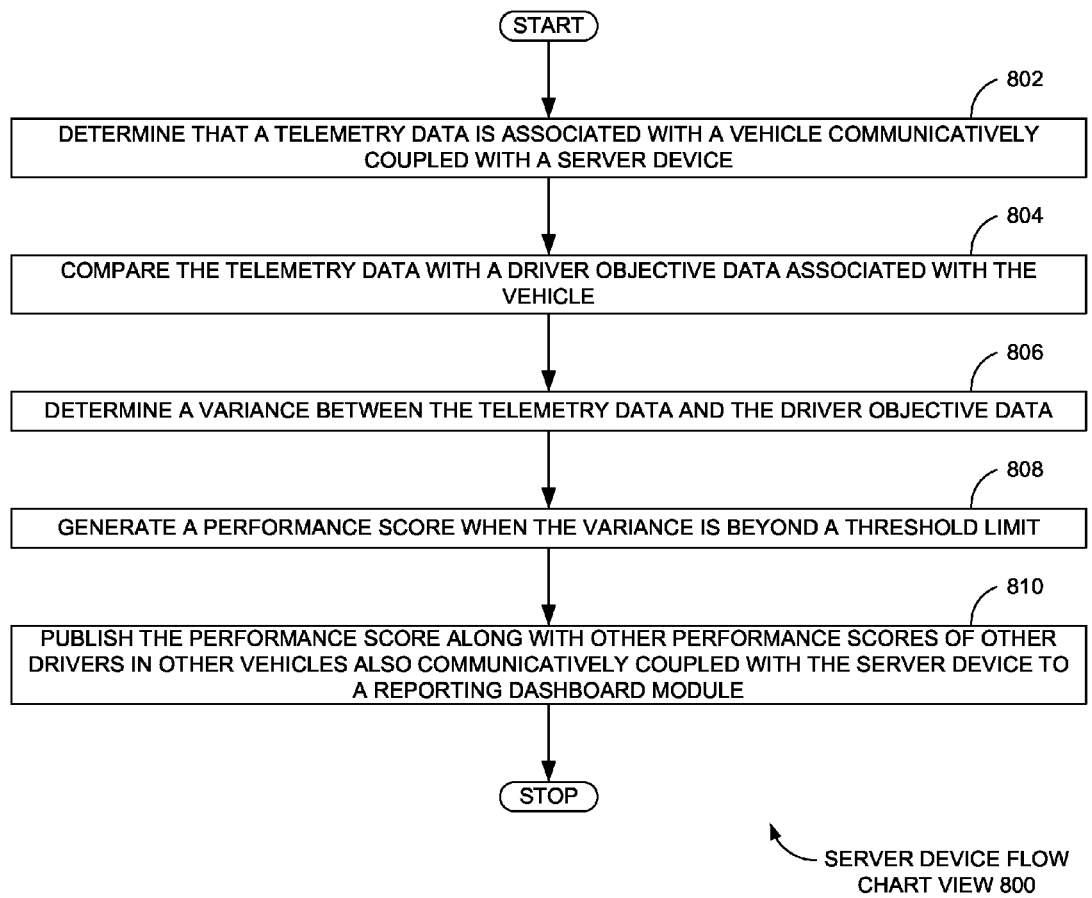
FIG. 8 illustrates a server device flow chart view, according to one or more embodiments.

FIG. 8 illustrates a server device flow chart view 800 according to one or more embodiments. According to FIG. 8 and one or more embodiments, a method of a server device 102 may comprise determining that a telemetry data 106 is associated with a vehicle 104 communicatively coupled with the server device 102 and comparing the telemetry data 106 with a driver objective data 108 associated with the vehicle 104. According to one or more embodiments, a variance 302 between the telemetry data 106 and the driver objective data 108 may be determined. A performance score 306 may be generated upon comparison of the variance 302 to a threshold limit 304. According to an illustrative embodiment, the performance score 306 may be published along with other performance scores of other drivers in other vehicles also communicatively coupled with the server device 102 to a reporting dashboard module 216.

Figure 9:
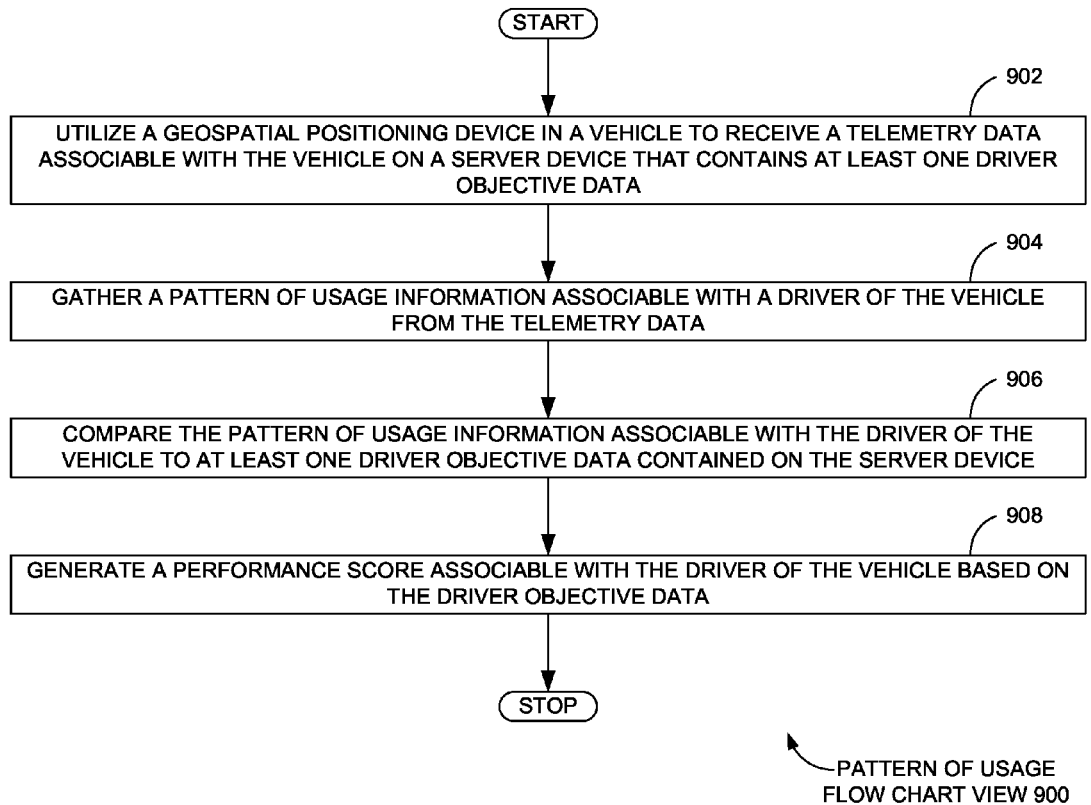
FIG. 9 illustrates a pattern of usage flow chart view, according to one or more embodiments.

FIG. 9 illustrates a server device flow chart view 900 according to one or more embodiments. According to FIG. 8 and one or more embodiments, a method may comprise utilizing a geospatial positioning device in a vehicle 104 to receive a telemetry data 106 associable with the vehicle 104 on a server device 102 that contains at least one driver objective data 108. The method may involve gathering a pattern of usage information associable with a driver of the vehicle 104 from the telemetry data 108. The pattern of usage information associable with the driver of the vehicle 104 may be compared to at least one driver objective data contained 108 on the server device 102 and a performance score 306 associable with the driver of the vehicle 104 based on the driver objective data 108 may be generated, according to one or more exemplary embodiments.

According to an illustrative example, the performance score 306 associable with the driver of the vehicle 104 may be compared to another performance score associable with a driver of another vehicle (see FIG. 4). The performance score 306 may be based on at least one driver objective data 108 measured over a predetermined period of time. A master score (e.g., a master performance score) may be assigned to a team of multiple drivers, according to one or more exemplary embodiments (see FIG. 5).

Figure 10:
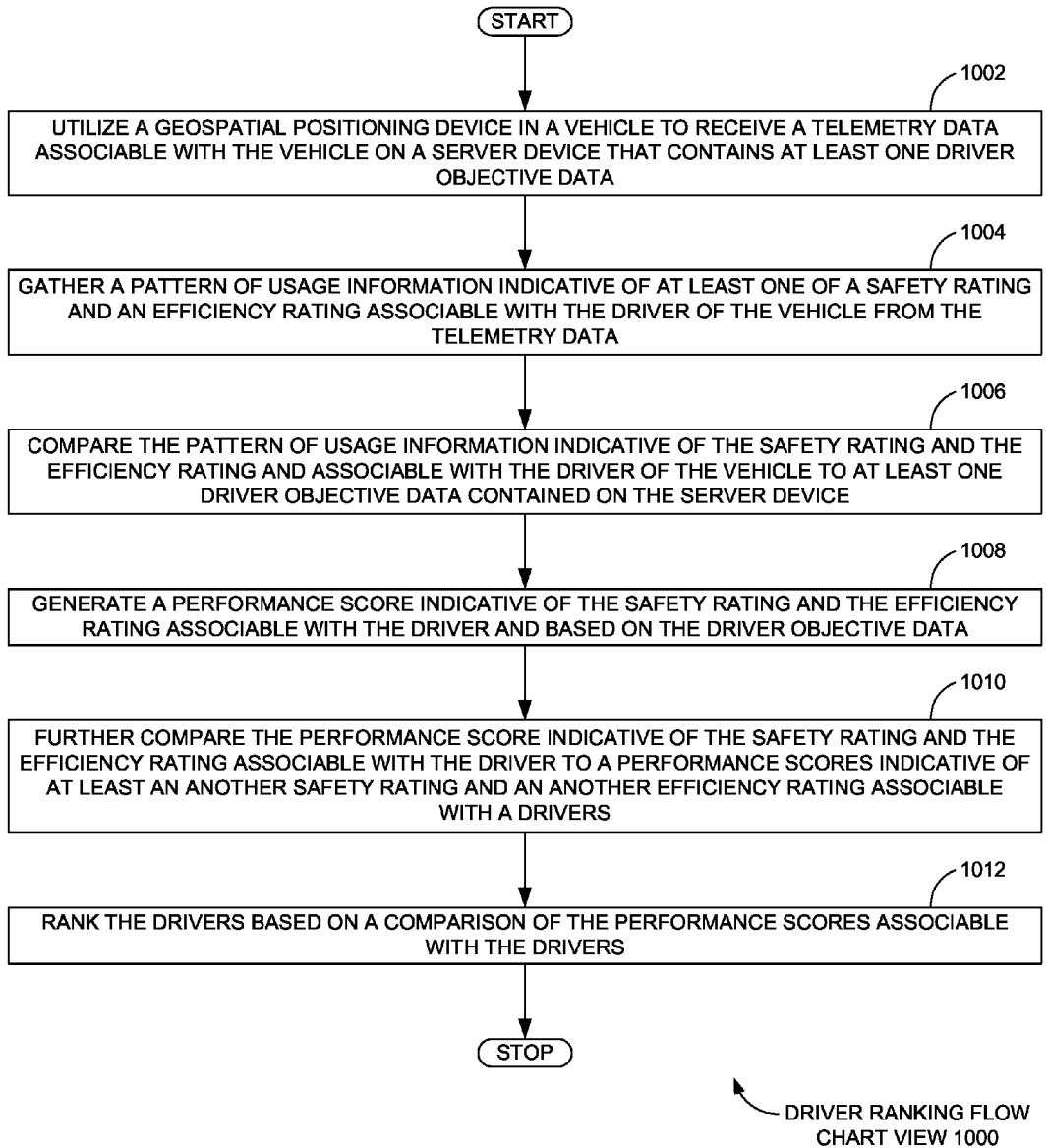
FIG. 10 illustrates a driver ranking flow chart view, according to one or more embodiments.

FIG. 10 illustrates a driver ranking flow chart view 1000 according to one or more embodiments. A method of improving a driver's behavior may comprise utilizing a geospatial positioning device in a vehicle 104 to receive a telemetry data 106 associable with the vehicle 104 on a server device 102 that may contain at least one driver objective data 108. A pattern of usage information indicative of a safety rating and/or an efficiency rating associable with the driver of the vehicle 104 may be gathered from the telemetry data 106. Thereafter, the pattern of usage information indicative of the safety rating and/or the efficiency rating and associable with the driver of the vehicle 104 may be compared to at least one driver objective data 108 contained on the server device 102.

According to one or more exemplary embodiments, a performance score 306 indicative of the safety rating and/or the efficiency rating associable with the driver and based on the driver objective data 108 may be generated. It will be appreciated that, according to one embodiment, the performance score 306 indicative of the safety rating and/or the efficiency rating associable with the driver may be further compared to a plurality of performance scores indicative of another safety rating and another efficiency rating associable with a plurality of drivers (see FIGS. 4 and 5). The method, according to one embodiment, may involve ranking the plurality of drivers based on a comparison of the performance scores associable with the plurality of drivers.

Figure 12:
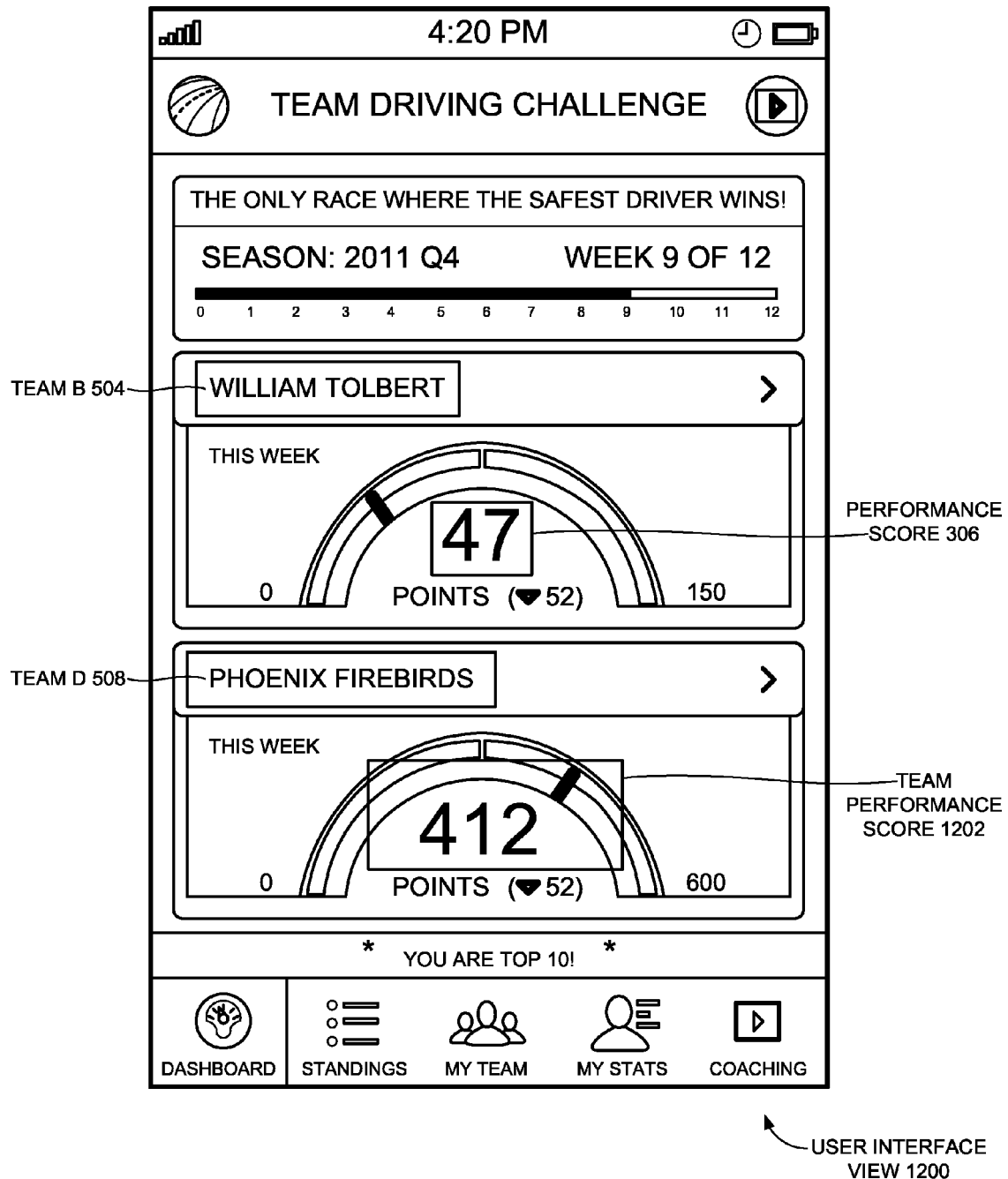
FIG. 12 illustrates a user interface view, according to one or more embodiments.
Figure 13:
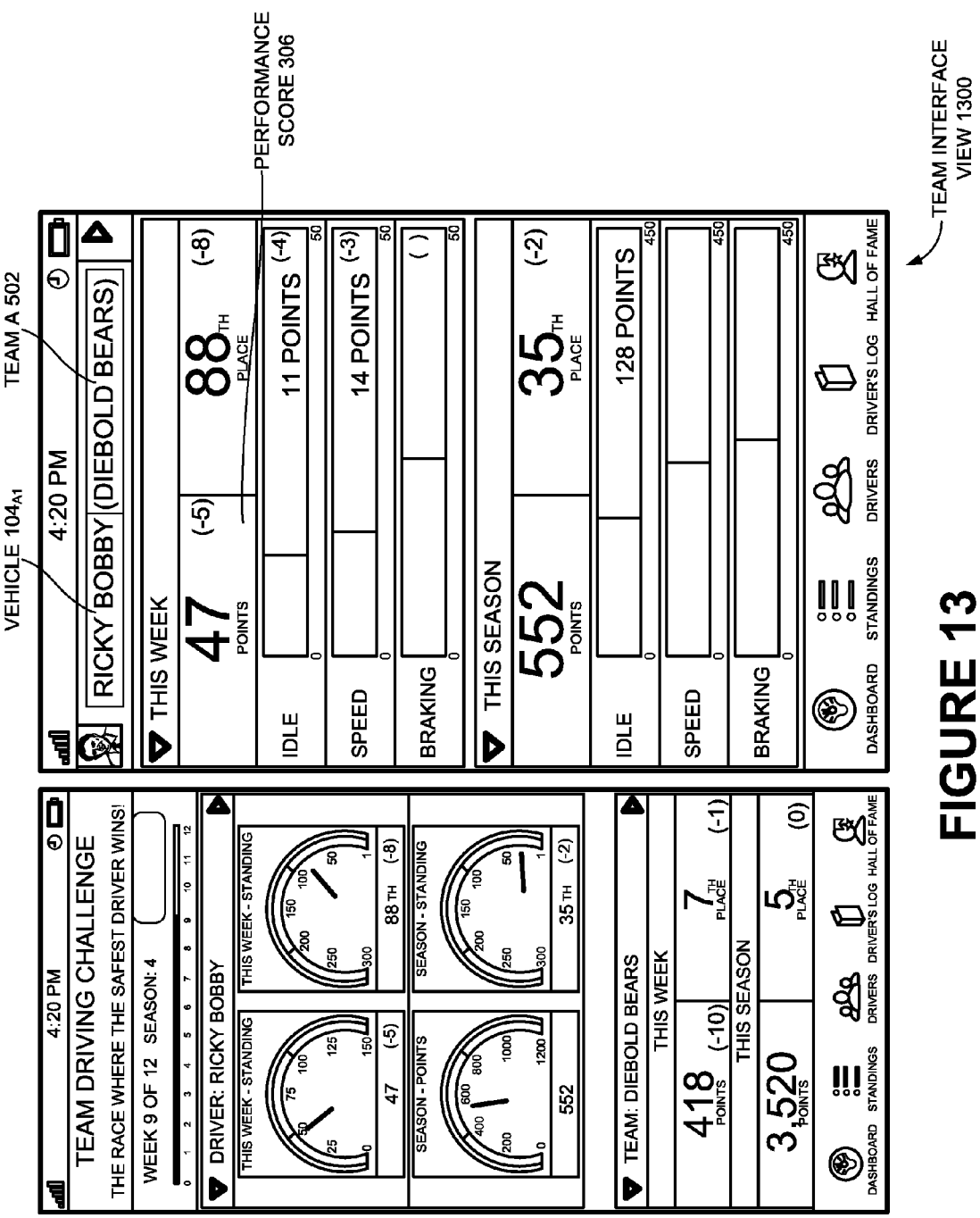
FIG. 13 illustrates a team interface view, according to one or more embodiments.

FIG. 11 illustrates a team analytics view 1100, according to one or more embodiments. A team driving challenge and/or a driver performance program may be created and implemented to improve driver safety and/or efficiency according to one or more embodiments. Various metrics may be used and implemented to this extent (e.g., as predetermined driver objective data 108), including but not limited to, percentage of minutes driving at and/or below the posted speed limit, percentage of driving minutes without a hard braking incident, percentage of authorized driving to total driving, percentage of driving minutes without an acceleration incident, percentage of minutes moving when engine is running, percentage of worked days with on-time daily disposition, etc. Each above mentioned metric may be assigned a scoring factor that may include a brake score, a speed score, an acceleration score, an idling score, etc. All these scores, according to one or more embodiments, may be combined to give rise to a total score. Teams of a plurality of drivers would then be ranked accordingly and a scaled score may be assigned to different teams based on the performance of individual drivers within that team (e.g., see Team A 502, Team B 504, Team C 506 and Team D 508 of FIGS. 5 and 11). FIGS. 12 and 13 illustrate a user interface view 1200 and a team interface view 1300 respectively, according to one or more embodiments.

According to an illustrative example, a method for improving commercial driver safety and efficiency may involve using individual and team competition based on actual driver behavior. According to one embodiment, the method may be used for improving the safety and efficiency of drivers in commercial vehicle fleets. Each driver may have a GPS tracking module installed in his/her vehicle. The GPS module may transmit vehicle telemetry (e.g., telemetry data 106) back to a central server (e.g., server device 102). According to one or more embodiments, vehicle telemetry may include (but may not be limited to), position, velocity, direction, acceleration, and/or engine on/off status of vehicle 104. The server device 102 may contain information on driver objectives (e.g., driver objective data 108). These objectives, according to one or more embodiments, may include (but may not be limited to), posted speed limits, route plans, engine idling durations, maximum rate of vehicle acceleration and/or deceleration, days/hours for approved vehicle use etc.

According to one or more exemplary embodiments, each driver may have an average ratio of minutes spent driving at or below the posted speed limit (e.g., limit date 702 of FIG. 7) to the total number of minutes spent driving. The ratio for each objective may be converted to numerical scores (e.g., see FIGS. 12 and 13), for each driver. Each driver may then be given an aggregate score resulting from a combination of individual objective scores, according to one embodiment. According to another embodiment, each driver may be assigned to a team of drivers (e.g., see FIG. 5). Each team may have a score that may be a combination of individual driver scores. According to one or more embodiments, each team may participate in a multi-week scoring competitions. Winning teams may be calculated at intervals throughout the competition season. The final interval of seasons may be a championship competition between season leading teams. A new season, according to one embodiment, may begin after completion of the final interval, with all scores reset to zero.

According to an illustrative example, a 12 week season may run sequentially throughout the year. The teams may be ranked at the end of each week, and winners may be calculated. Week 12, according to one embodiment, may be the "Superbowl of Driving Week." Top teams from the "regular" season may be eligible to compete in the final week of competition for the grand champion award. According to other embodiments, all individual and team scores would be reset to zero, and a new competition reason would begin.

It will be appreciated that, according to one or more embodiments, central servers (e.g., server device 102) may share live and historical scoring information to drivers in a variety of matters including but not limited to, web-based applications, mobile applications (e.g., see FIGS. 12 and 13), periodic emails, and/or periodic SMS messages. This may allow all drivers to access current scoring and ranking information for all teams and individuals in the competition. In one or more exemplary embodiments, commercial fleet managers may have the opinion of establishing an incentive plan based on driver and/or team performance in the competition. It will be appreciated that, the combination of inherent driver competitiveness and optional incentive programs may cause drivers to improve their driving performance with respect to the objectives (e.g., driver objective data 108) established by the fleet manager, according to one or more embodiments.

According to other embodiments, driver behavior may be positively impacted by providing trend information directly to the driver in a constructive fashion. This method may eliminate management in the "review mirror." It will be appreciated that, according to one or more exemplary embodiments, the driver performance program may work as a contest and/or a game with drivers competing as teams as well as for individual incentives. Drivers, according to one embodiment, may have a view into and/or access to summary and/or trend information of their overall performance (e.g., see FIGS. 12 and 13). Drivers may be able to drill down into the specific aspects of their driving behavior and/or performance such as speeding, idle time, and/or aggressive driving (e.g., a fast rate of acceleration and/or a hard braking incident).

According to one or more illustrative embodiments, direct summary feedback to the driver in a game and/or contest format may incentivize, coach and/or influence the driver to improve his/her driving safety and efficiency. The driver safety program may have a mobile application dashboard (e.g., see FIGS. 12 and 13). It may affect change at the driver level by implementing game and/or contest aspects such as team competition, individual recognitions (e.g., most valuable driver, pole position winner, race winner, etc.), configurable seasons (e.g., dates, duration, etc.), the ability to see the performance of other teams and teammates, and/or collaboration and/or communication between various team members.

According to other exemplary embodiments, driver performance may be scored and/or monitored in the following areas, including but not limited to, engine idling time, speeding, hard braking incidents, and hard acceleration incidents, etc. According to one embodiment, only trending data may be displayed in the dashboard module 216 (not specific incident data). The initial user-interface screen may indicate driver performance as well as relative performance (compared to other teams and other drivers) (e.g., see FIGS. 12 and 13). Such data and information may be visible in near real-time to all drivers. The goal of the method may be to tie merits and incentives and to create a relationship with the driver, according to one or more embodiments. It will also be appreciated that, such performance data and information may be shared on social media websites such as Facebook®, Twitter®, etc., according to one or more embodiments.

Although the present embodiments have been described with reference to specific example embodiments, it will be evident that various modifications and changes may be made to these embodiments without departing from the broader spirit and scope of the various embodiments. For example, the various devices (e.g., the server device 102), modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry). For example, data transmission technologies, geospatial positioning devices, and devices other than ones employing GPS technology (e.g., RFID, RTLS, OEM telematics, location detection based on cell phone towers, electromagnetic waves, optical emissions, infrared, radar, sonar, radio, Bluetooth™ etc.) may be used to transmit telemetry data 106 for the purposes of the invention described herein, according to one or more exemplary embodiments.

Particularly, several modules as illustrated in FIG. 2 may be employed to execute the present embodiments. The telemetry data module 204, the server module 202, the driver objective data module 206, the vehicle module 208, the variance module 210, the threshold module 212, the performance score module 214, the dashboard module 216, the safety & efficiency module 218, and all other modules of FIGS. 1-14 may be enabled using software and/or using transistors, logic gates, and electrical circuits (e.g., application specific integrated ASIC circuitry) such as a security circuit, a recognition circuit, a dynamic landmark circuit, an ignition event circuit, a store circuit, a transform circuit, an ICE circuit, and other circuits.

Figure 14:
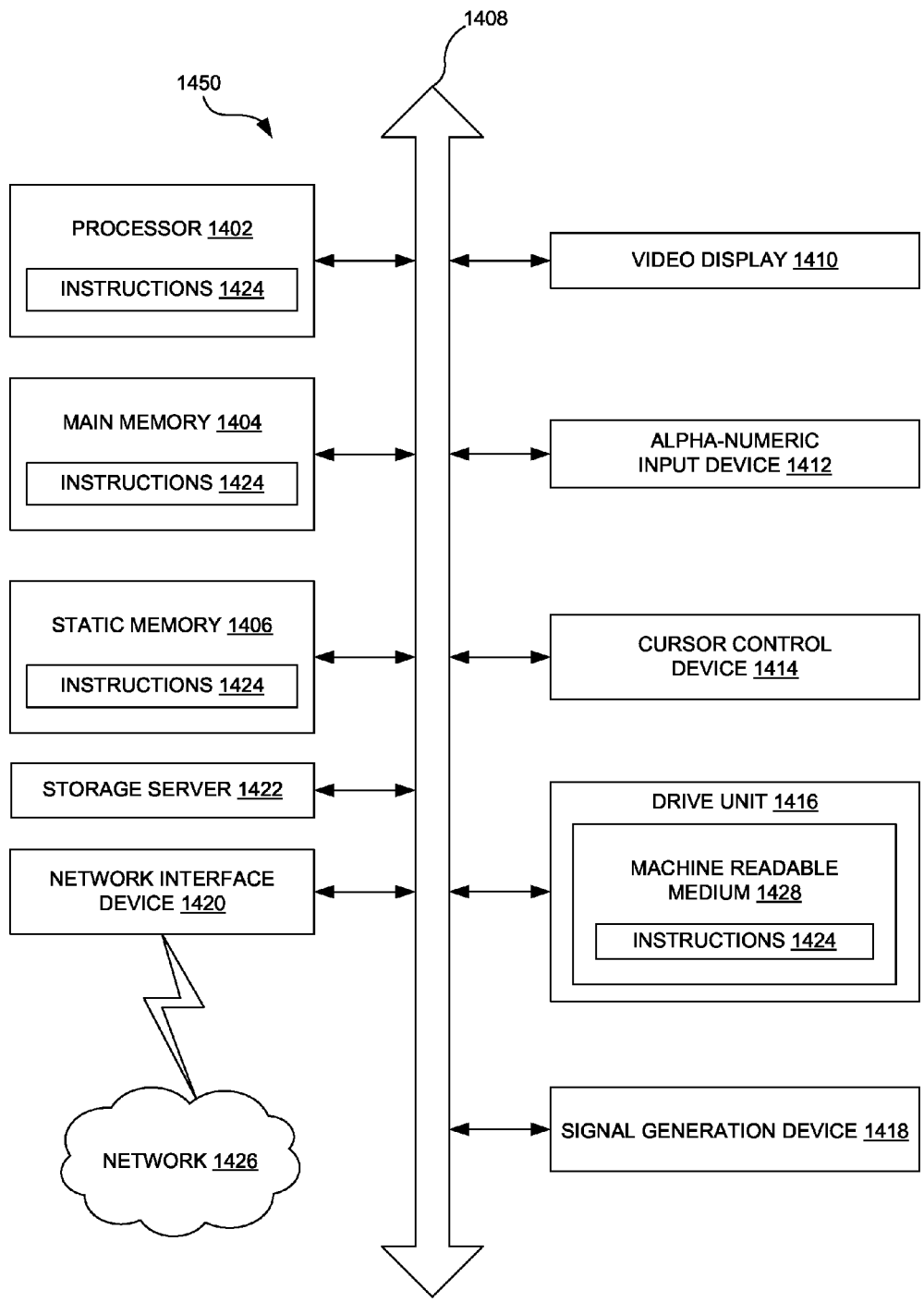
FIG. 14 is a diagrammatic view of a data processing system in which any of the embodiments disclosed herein may be performed, according to one embodiment.

FIG. 14 may indicate a personal computer and/or the data processing system in which one or more operations disclosed herein may be performed. The processor 1402 may be a microprocessor, a state machine, an application specific integrated circuit, a field programmable gate array, etc. (e.g., Intel® Pentium® processor, 620 MHz ARM1176®, etc.). The main memory 1404 may be a dynamic random access memory, a non-transitory memory, and/or a primary memory of a computer system. The static memory 1406 may be a hard drive, a flash drive, and/or other memory information associated with the data processing system. The bus 1408 may be an interconnection between various circuits and/or structures of the data processing system. The video display 1410 may provide graphical representation of information on the data processing system. The alpha-numeric input device 1412 may be a keypad, a keyboard, a virtual keypad of a touch-screen and/or any other input device of text (e.g., a special device to aid the physically handicapped). The cursor control device 1414 may be a pointing device such as a mouse. The drive unit 1416 may be the hard drive, a storage system, and/or other longer term storage subsystem. The signal generation device 1418 may be a bios and/or a functional operating system of the data processing system. The network interface device 1420 may be a device that performs interface functions such as code conversion, protocol conversion and/or buffering required for communication to and from the network 1426. The machine readable medium 1428 may provide instructions on which any of the methods disclosed herein may be performed. The instructions 1424 may provide source code and/or data code to the processor 1402 to enable any one or more operations disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of a server device, comprising:
    determining, through the server device, telemetry data is associated with a vehicle of a plurality of vehicles communicatively coupled in contact with the server device;
    comparing, through a processor of the server device communicatively coupled to a memory, the telemetry data with driver objective data associated with a driver of the vehicle;
    determining, through the processor, a total variance between the telemetry data and the driver objective data, wherein determining the total variance between the telemetry data and the driver objective data further comprises executing an algorithm by the processor, wherein the algorithm, comprises:
        calculating differences between the vehicle's telemetry data to speed limit data, engine idling duration data, vehicle acceleration data, and vehicle deceleration data of the driver objective data,
        dividing the calculated differences by their respective driver objective data to obtain percentage values, and
        adding the percentage values to obtain the total variance;
    generating, through the processor, a performance score of the driver indicative of an efficiency rating associable with the driver, based on the total variance; and
    displaying, through a dashboard display of the vehicle through a reporting module, the performance score of the driver, along with performance scores of other drivers driving the plurality of vehicles,
    wherein:
        the speed limit data is a posted speed limit at a particular geospatial location surrounding a present location of the vehicle as determined through a mapping data source of the server device and calculating the difference between the vehicle's telemetry data to the speed limit data comprises calculating the difference between the vehicle's average speed and the posted speed limit,
        the engine idling duration data is a predetermined and preferred amount of time an engine of a vehicle is idle in the geospatial vicinity surrounding the present location of the vehicle and calculating the difference between the vehicle's telemetry data to the engine idling duration data comprises calculating the difference between the vehicle's engine idling duration time and the predetermined and preferred amount of time,
        the vehicle acceleration data is a predetermined and preferred average acceleration rate of a vehicle in the geospatial vicinity surrounding the present location of the vehicle and calculating the difference between the vehicle's telemetry data to the vehicle acceleration data comprises calculating the difference between the vehicle's average acceleration rate and the predetermined and preferred average acceleration rate, and
        the vehicle deceleration data is a predetermined and preferred average deceleration rate of a vehicle in the geospatial vicinity surrounding the present location of the vehicle and calculating the difference between the vehicle's telemetry data to the vehicle deceleration data comprises calculating the difference between the vehicle's average deceleration rate and the predetermined and preferred average deceleration rate.

2. The method of claim 1, further comprising comparing the performance score associated with the driver to the plurality of performance scores associated with the other drivers.

* * * * *